Aug. 26, 1969  P. A. STROH  3,463,494
PRACTICE DEVICE FOR CATCHING FISH
Filed May 1, 1967  2 Sheets-Sheet 1
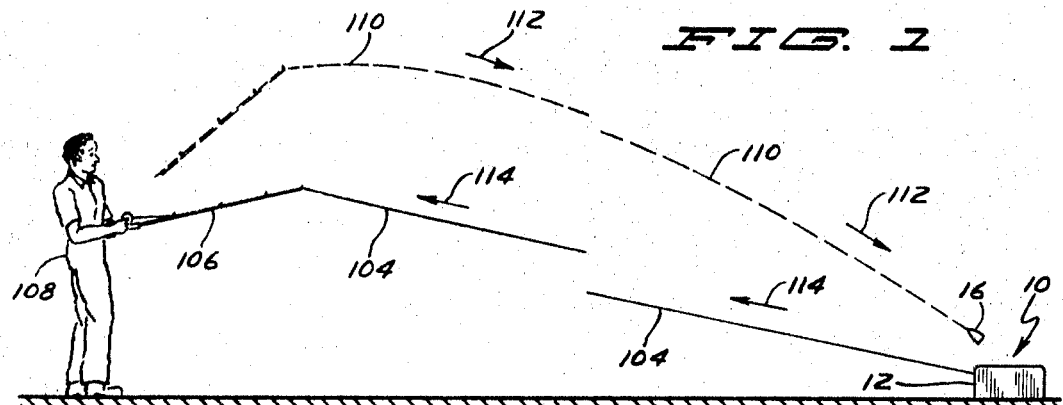
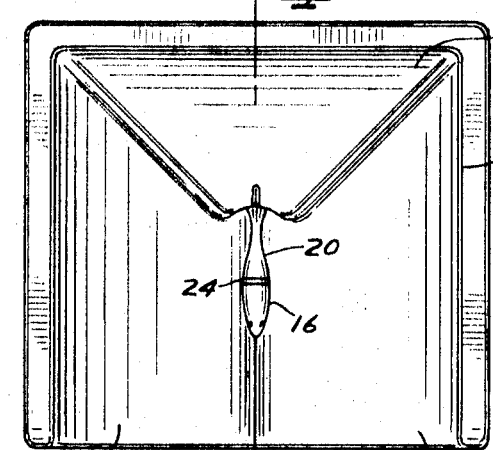
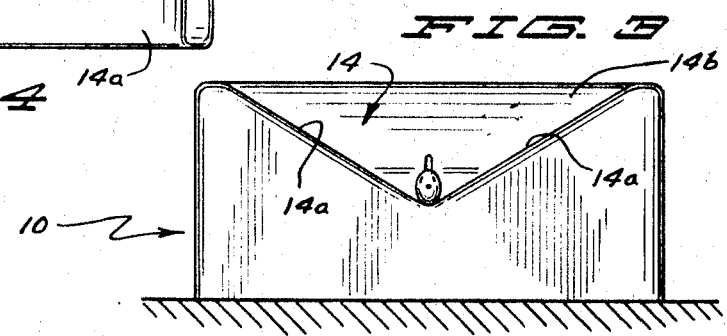
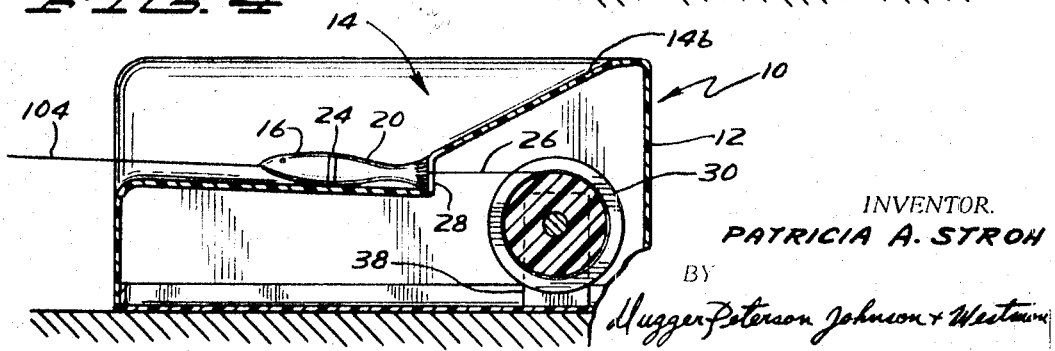
INVENTOR.
PATRICIA A. STROH
BY
Mugger Peterson Johnson + Western
ATTORNEYS

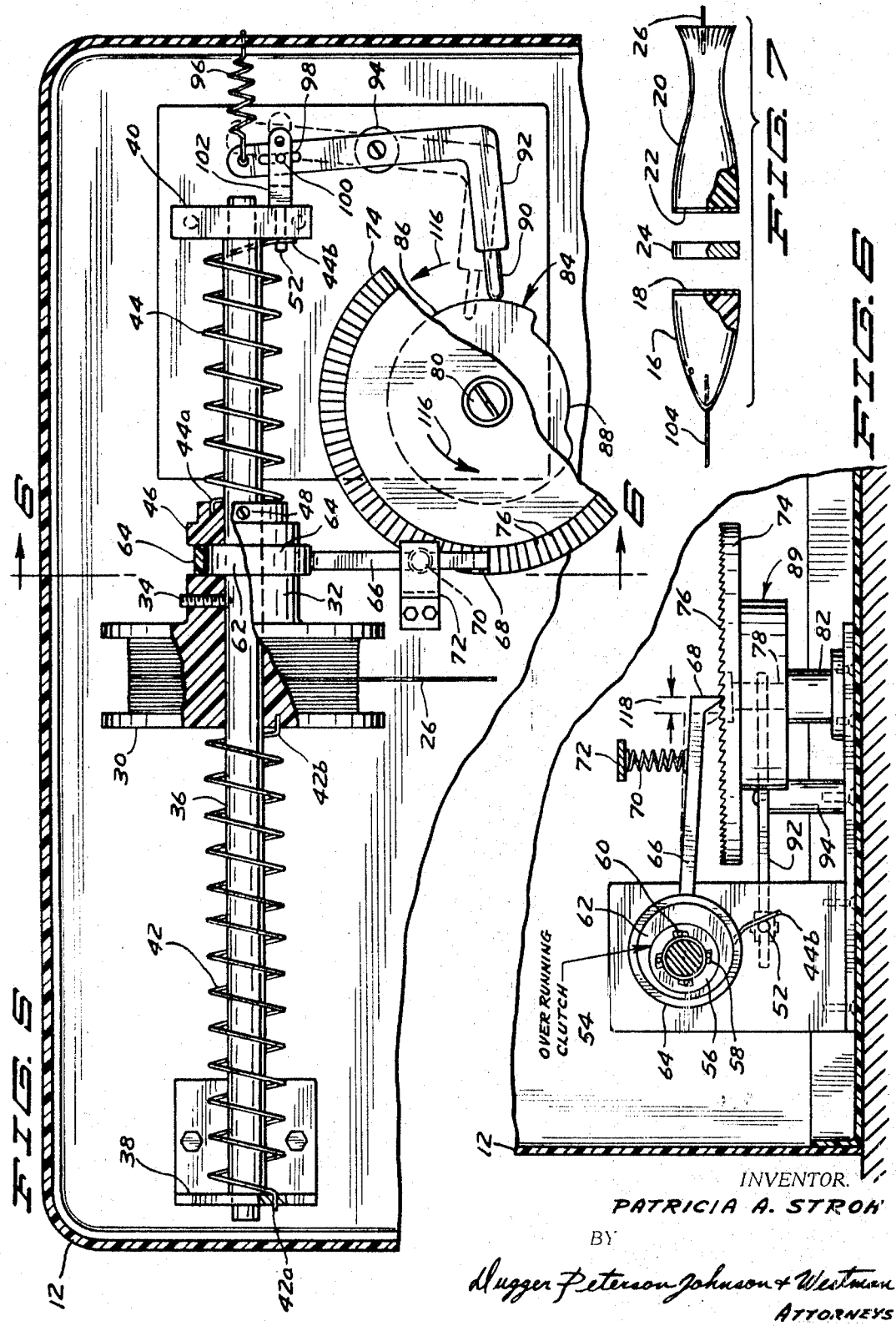

United States Patent Office 3,463,494
Patented Aug. 26, 1969

3,463,494
PRACTICE DEVICE FOR CATCHING FISH
Patricia A. Stroh, 7009 S. Cedar Lake Road,
Minneapolis, Minn. 55426
Filed May 1, 1967, Ser. No. 635,030
Int. Cl. A63b 67/10
U.S. Cl. 273—101        6 Claims

ABSTRACT OF THE DISCLOSURE

Two members, one of which is a magnet, simulate a fish. One of the members is attached to the end of a fishline and the other to a take-up line wound on a reel, the unwinding of which is opposed by spring action. Accurate casting of the fishline effects the engagement of the two members; a sufficient manual pull on the fishline thereafter effects their separation.

BACKGROUND OF THE INVENTION

Field of the invention

This invention relates generally to practicing devices for fishermen, and pertains more particularly to a device for increasing the fisherman's proficiency in both casting and retrieving a fish.

Description of the prior art

I am aware of apparatus for teaching the art of casting and retrieving, but the prior are devices with which I am familiar are quite complex and costly to manufacture. In one such device, there is no magnetic attraction of two parts constituting a fish. Actually, the pull exerted by the fisherman is reflected in the illumination of various lamps which are indicative of the pull being applied to the line, a certain value as indicated by lighting of a particular lamp corresponding to the snapping or breaking of the line. An electric motor is utilized for operating the device in a manner such as to simulate the different amounts of pulling force that would be applied to the line by a real fish.

SUMMARY OF THE INVENTION

In the present invention, the practicing fisherman casts one part of a simulated fish, as he would a lure, in the direction of another part so as to cause the two parts to become magnetically engaged with each other. This can only be achieved when the casting is sufficiently accurate. A casing having a trough open at the front and top will allow the fisherman to make a "catch" even if his aim is not 100% precise. After catching the fish, he achieves additional practice by virtue of the fact that a take-up reel which is spring-biased increasingly resists the retrieving of the fish. While the take-up line is allowed to be payed out, nonetheless if too much force is applied by the fisherman, then the two portions of the fish will become separated, the tensile force under these circumstances becoming more than the force that magnetically attracts the parts together. Additionally, the practicing fisherman is provided with several attempts, a pawl and ratchet arrangement ultimately effecting the release of one of two springs that oppose the rotation of the take-up reel. When this occurs, the fisherman is enabled to readily pull the fish completely toward him. By the action provided by the second spring, which is considerably weaker than the first, the take-up reel is returned to its original rotative position.

BRIEF DESCRIPTION OF THE DRAWINGS

FIGURE 1 shows my device in actual use, the phantom arc denoting the trajectory followed during a cast, and the straight line indicating the direction of retrieve after the fish has been caught, both paths being broken to represent an intermediate casting distance;

FIGURE 2 is a top plan view of my device;
FIGURE 3 is a front elevational view of my device;
FIGURE 4 is a sectional view taken in the direction of line 4—4 of FIGURE 2;
FIGURE 5 is a fragmentary plan view generally corresponding to FIGURE 2 but with the top of the casing removed so as to expose the functional parts contained therewithin;
FIGURE 6 is a sectional view taken in the direction of line 6—6 of FIGURE 5; and
FIGURE 7 is an exploded view of one form the simulated fish may assume when practicing the teaching of the invention.

DESCRIPTION OF THE PREFERRED EMBODIMENT

Referring now in detail to the drawings, the device exemplifying my invention has been designated generally by the reference numeral 10. The device 10 in the illustrated situation includes a casing 12 having an upwardly facing trough or V-notch 14. More specifically, the trough 14 is formed by upwardly diverging walls 14a and an upwardly and rearwardly sloping wall 14b.

The trough 14 is open at the top and front for the accommodation of a simulated fish best seen in FIGURE 7 which is composed of a first member or head portion 16 having a steel plate 18 affixed thereto and a second member or tail portion 20 having a second steel plate 22 affixed thereto. Through the agency of a flat magnet 24, such as a conventional ceramic disc, the members will be releasably held or attracted to each other. Quite obviously, the construction of the fish and the manner in which it is magnetically held together is susceptible to wide variation. For example, the magnet 24 can be made integral with either the member 16 or the member 20. Where the magnet 24 is separate, however, it can be replaced with magnets of lesser or greater strength, thereby allowing the user of my device to make different substitutions and thereby readily vary the tensile force needed to pull the fish apart when retrieving same after it has been caught. Still further, either member 16 or 20 might constitute the magnet and the other steeel. This will become more apparent as the description progresses.

At this time, attention is directed to a flexible line 26 extending through an opening or aperture 28 (FIGURE 4) in the rear wall 14b. The line 26 extends rearwardly onto a take-up spool or reel 30 having an integral hub 32 formed thereon so that a set screw 34 can be employed for the purpose of fixedly mounting the reel 30 on a shaft 36. The shaft 36 is rotatably journaled in bearing supports 38, 40.

A coil spring 42 having a relatively weak spring constant (compared to an additional spring presently to be referred to) has one end 42a thereof anchored to the support 38 and its opposite end 42b anchored to the reel 30 as can be readily discerned from FIGURE 5.

Whereas the coil spring 42 is relatively weak, a coil spring 44 having a stronger spring constant has one end 44a anchored to a coupling member 46 affixed to the shaft 36 by means of a set screw 48 and its other end 44b releasably restrained by a reciprocable or shiftable pin 52. The manner in which the pin 52 is actuated will be presented hereinafter.

It will be observed that the coupling member 46 is mounted on the shaft 36 in a spaced relationship with the hub 32, thereby providing space for an over-running or one-way clutch 54. Such clutches are of well-known construction which run freely in one direction and which grip instantaneously in the other direction. More specifically, the pictured clutch 54 includes a ring 56 having several tapered notches 58 therein (FIGURE 6) in which are disposed cylindrical rollers 60 which bear directly against a ring secured to the shaft 36. Hence, as viewed in FIGURE 5, when the shaft 36 rotates in a counterclockwise direction, the rollers will be forced toward the small ends of the notches to effect the gripping or clutching action.

Circumscribing the ring 56 is an eccentric 62, and encircling the eccentric 62 is a ring 64 having an arm 66 integral therewith, the arm 66 being formed with a pawl 68 at its free end. A coil spring 70 acts on the arm to urge the arm downwardly for a purpose mentioned below. A retaining strip 72 holds the coil spring 70 in place so that it performs the foregoing function.

A ratchet wheel 74 having a number of ratchet teeth 76 thereon is mounted on a vertical shaft 78, a screw 80 effecting the attachment. A bearing support 82 journals the shaft 78. As can be seen from FIGURES 5 and 6, subjacent the ratchet wheel 74 is a cam 84; the cam rotates in unison with the wheel 74, it might be explained. The major portion of the periphery of the cam 84 has a relatively large radius, the segment so provided having been indicated by the reference numeral 86. However, from FIGURE 5, it will be seen that the cam 84 is formed with a notch 88 subtending a prescribed arc, the cam having a lesser radius over this portion of its periphery.

Included in what will be termed a latch or release mechanism is a cam follower 90 that rides against the periphery of the cam 84, that is, the surfaces designated 86 and 88. The cam follower 90 is carried on an L-shaped rocker arm 92 that functions as a release lever. A post 94 serves as a pivotal bearing for the rocker arm 92. As can be understood from FIGURE 5, a spring 96 causes the rocker arm 92 to be biased in a clockwise direction, thereby causing the cam follower 90 to bear against the cam 84. The rocker arm 92 has a slot 98 which receives a pin 100 supported on a clevis 102, the clevis 102 being integral with the earlier-mentioned shiftable or reciprocable pin 52 that normally engages the end 44b of the relatively strong spring 44. Stated somewhat differently, the pin 52 performs its latching function during the major portion of the rotation of the cam 84, this taking place when the cam follower 90 is riding against the peripheral surface labeled 86. However, when the notch 88 is rotated into registry with the cam follower 90, then the spring 96 rotates the rocker arm 92 in its clockwise direction so as to shift or pull the pin 52 to the right as viewed in FIGURE 5 which allows the end 44b of the spring 44 to twist freely and thereby release the spring after it has become wound as will be better understood from the operational sequence given below.

In order to comprehend the manner in which my device 10 operates, reference should now be made to FIGURE 1 where a fishline 104 attached to a fishing rod 106 held by a practicing fisherman 108 is pictured. Since it is contemplated that the device 10 will be located at a distance sufficiently remote from where the man 108 is standing so as to introduce considerable challenge into the practice procedure, the fishline 104 has been "broken" as can easily be observed. For instance, the fisherman 108 may stand 30 feet or so from the device 10 or even more. The distance that he is from the device 10 is up to the particular user and will depend to some extent upon the casting skill of the practicing fisherman.

Still refering specifically to FIGURE 1, the arrows designated by the numeral 110 denote the casting trajectory that is traversed in order to give or produce a strike. The retrieving direction is indicated by the arrows 112. Additional arrows 114 signify the direction in which the ratchet wheel 74 rotates which results in the ultimate unlatching and release of the energy that becomes stored in the coil spring 44. Actually, the ratchet wheel 74 is only incrementally rotated or advanced, such an increment being graphically presented as designated by the space labeled 118 in FIGURE 6.

With the foregoing information in mind, the fisherman 108 after he has selected the position for the device 10 then casts the member 16 representing the head portion of the fish. This portion is attached directly to the fishline 104 and during casting acts as the bait. The member 20 representing the tail portion of the fish when assembled is attached directly to the take-up line 26. Consequently, if the fisherman 108 makes a reasonably accurate cast, the member 16 will land in the trough 14 and will become magnetically engaged with the member 20. At this time, it should be explained that the magnet 24, which has been shown as a separate element in FIGURE 7, may be initially placed against either the steel plate 18 or the steel plate 22. Assuming that the magnet 24 is against the steel plate 18 on the member 16, the member 16 is made somewhat heavier than it would be if the magnet 24 were placed initially against the member 20. Hence, the fisherman has a choice at the outset as to whether the member 16 is to be made somewhat lighter or heavier as he may desire than the member 20. Also, if a plurality of magnets 24 are supplied, the fisherman has still another choice in varying the weight, and where any such substituted magnet is stronger or weaker than a given magnet the tensile force needed to separate the members 16 and 20 from each other can be controlled.

When a strike has been made and the members 16 and 20 have been releasably joined by reason of the magnetic attraction provided by the magnet 24, the fisherman 108 then attempts to retrieve the fish. A challenge is provided by virtue of the predetermined amount of tensile force needed to retain the members 16 and 20 together, for the fisherman should not pull the two members apart, for this would correspond to losing the fish that he has caught.

What transpires at this stage is that the now-held-together fish is moved from the position shown in FIGURES 2, 3 and 4 away from the casing 12, the line 26 being payed from the take-up reel 30 as the fisherman pulls in the fishline 104. Both coil springs 42 and 44 are instrumental in opposing or resisting the rotation of the reel 30 in a direction to pay out the line 26 because the end 42a of the spring 42 is affixed to the bearing support 38 and the end 42b is anchored to the reel 30. In a similar fashion, inasmuch as the end 44b of the spring 44 is held in a latched condition by the pin 52 and the end 44a is anchored to the coupling member 46 which rotates in unison with the reel 30, both the reel 30 and the coupling member 46 being attached by set screws to the shaft 36, the spring 44 is wound along with the spring 42 as the line 26 is pulled. Naturally, the farther the line 26 is pulled from the casing 12, the more tightly the springs 42 and 44 are wound. In other words, the torsional force or reaction supplied by the springs 42 and 44 is progressively increased. It will be recalled that a predetermined amount of tensile force is needed to separate the members 16 and 20. If the fisherman 108 exercises too much of a retrieving pull via the fishline 104, then the undesired separation of the member 16 from the member 20 will be produced, for the magnet 24 will not be of adequate strength to hold the members 16, 20 together.

To make my device 10 more appealing and versatile, the number of attempted retrieves can be varied. This is through the agency of the ratchet wheel 74. The way this occurs is that for each revolution of the reel 30 as the line 26 is pulled therefrom the eccentric 62 moves the pawl 68 the distance represented by the increment 116. The over-running or one-way clutch 54 is rotating in unison with the shaft 66 when the shaft is being rotated in the direction that it rotates when the line 26 is being pulled off, that is, clockwise as seen in FIGURE 6. Hence, each rotation of the reel 30 will cause the ratchet wheel 74 to be advanced the distance represented by the numeral 118. A number of rotations of the reel 30 will result in a sizable rotative advancement of the ratchet wheel 74. Since both springs 42 and 44 are effective during this period, the torsional reaction will be constantly increased. As already indicated, a goal of the invention is to enable the fisherman to sense when he has exerted too much of a retrieving force on the fishline 104. Consequently, the springs 42 and 44 should not be wound so tightly that the member 16 is separated from the member 20. Should a separation of these members result, the fisherman can consider that he has lost his fish and should moderate his efforts on succeeding attempts.

As long as the fisherman does not pull apart the members 16 and 20, any desired number of retrieves can be made. However, the minimum number of retrieves will indicate, at least to some degree, the proficiency of the fisherman. Assuming, for the sake of discussion, that four attempts are to be incorporated into the device for a suggested 30 foot spacing of the casing 12 from the fisherman 108, the number of revolutions of the reel 30 for each attempt will result in a paying out of, any, approximately 15 feet. Naturally, a given number of revolutions of the reel 30 will be necessary to effect this amount of line pay out. Since the number of revolutions of the reel 30 influence the tightness to which the springs 42 and 44 will be wound, it follows that the fisherman should not wind the springs 42 and 44 beyond a certain amount, for he will then cause the member 16 to separate from the member 20.

If after the fourth retrieve (such figure having been arbitrarily selected above), the coil spring 44, this being the stronger of the two springs, is to be unlatched so that the energy stored therein is released without turning the reel 30, then the cam follower 90 moves into the notch 88 so that the pin 52 is retracted from its engaged relationship with the spring end 44a. The end 44a merely twists rapidly about the shaft 36, the end 44a bearing against the support 40 in so doing.

After the release of the relatively strong spring 44 has been effected, only the influence of the relatively weak spring 42 remains. Inasmuch as the fisherman 108 has been successful in not pulling the members 16, 20 apart, he can then pull toward him the still assembled fish that he has caught without the members 16, 20 separating. The spring 42, irrespective of the amount it is wound, never exerts a sufficient torsional force so as to cause separation of the members 16 and 20. When the fisherman 108 has grasped the still-assembled members 16 and 20, he can manually separate them and then the member 20 when released by the fisherman will be pulled back toward the casing 12 by reason of the wound weak spring 42.

Since the clutch 54 has been rotating the ratchet wheel 74 during the time that the fisherman is pulling the assembled members 16 and 20 toward him, the notch 88 in the cam 84 is being advanced also. Thus, the latch mechanism comprised of the rocker arm 92 and the pin 52 will be returned to a set condition so that the foregoing action can be repeated. Since the rotation of the cam 84 might not be precisely to the extent necessary to return the peripheral surface 86 into registry with the cam follower 90, the fisherman can pull the line 26 farther in order to reach the larger radius surface 86 since he can easily feel when the cam follower starts riding up the slope from the notch 88 onto the surface 86. Quite obviously, there is no advancement of the ratchet wheel 74 and hence no rotation of the cam 84 when the relatively weak coil spring 42 is returning the manually-separated member 20 to its original position in the trough 14 of the casing 12 in preparation for another cast.

The second cast, if accurate, will result in the members 16 and 20 becoming magnetically engaged once more as they appear in FIGURE 4. The retrieving operation is then repeated. It should be noted, though, that the fisherman 108 does not have to walk up to the device 10 in order to reset it preparatory to his succeeding cast. This is done automatically.

I claim:
1. In a practice device for catching fish, a pair of magnetically engageable members, at least one of which members is magnetized so as to be attracted to the other to releasably hold said members together and which members are separable from each other when a predetermined amount of tensional force is applied, a take-up reel, a line wound on said take-up reel having one end thereof attached to one of said members, and a coil spring torsionally opposing the rotation of said reel in one direction to thus resist the paying out of said line, whereby when a pull is exerted on the other of said members, said reel will allow said line to be payed out while said coil spring increasingly opposes the rotation of said reel until said members separate due to said predetermined amount of tensional force being reached.

2. A device in accordance with claim 1 including a casing having an upwardly facing trough open at its forward end and closed at its rear end, said closed end having an aperture through which said take-up line extends, whereby when said one member initially resides in said trough and said other member is attached to a fishline, the accurate casting of said other member in the direction of said one member will establish magnetic engagement of said members.

3. A device in accordance with claim 2 including means actuated by said reel for releasing one end of said coil spring to allow it to unwind after a certain number of revolutions of said reel have been reached.

4. A device in accordance with claim 3 in which said release means includes a latch mechanism engaging one end of said coil spring, a rotatable cam for operating said latch mechanism to cause disengagement of said one spring end, a ratchet wheel for rotating said cam, and a pawl operated by the rotation of said reel to rotate incrementally said ratchet wheel.

5. A device in accordance with claim 4 including a one-way clutch operable to advance said ratchet wheel only when said reel is rotated in one direction, and an eccentric encircling said one-way clutch so as to actuate said pawl to effect the incremental rotation of said ratchet wheel each time that said reel makes a revolution.

6. A device in accordance with claim 5 including a second coil spring for also opposing the rotation of said reel, said second spring having a lesser spring constant than said first spring for causing said reel to pull in said take-up line after the release of said first coil spring and after manual separation of said members from each other.

References Cited

UNITED STATES PATENTS

| 1,416,741 | 5/1922 | Nicholls et al. | 272—83 |
| 2,320,145 | 5/1943 | La Due. | |
| 2,343,002 | 2/1944 | Colaluca | 273—105 XR |
| 2,544,128 | 3/1951 | Bell | 272—1 |
| 2,557,789 | 6/1951 | Lanka | 273—140 |
| 2,747,872 | 5/1956 | Harvey | 273—140 XR |

FOREIGN PATENTS 530,679   1921   France.

ANTON O. OECHSLE, Primary Examiner

PAUL E. SHAPIRO, Assistant Examiner

U.S. Cl. X.R.

46—241; 272—83; 273—1, 95, 102